No. 699,271. Patented May 6, 1902.
A. D. WILLIAMSON.
ACETYLENE GAS GENERATOR.
(Application filed Nov. 5, 1900.)
(No Model.)
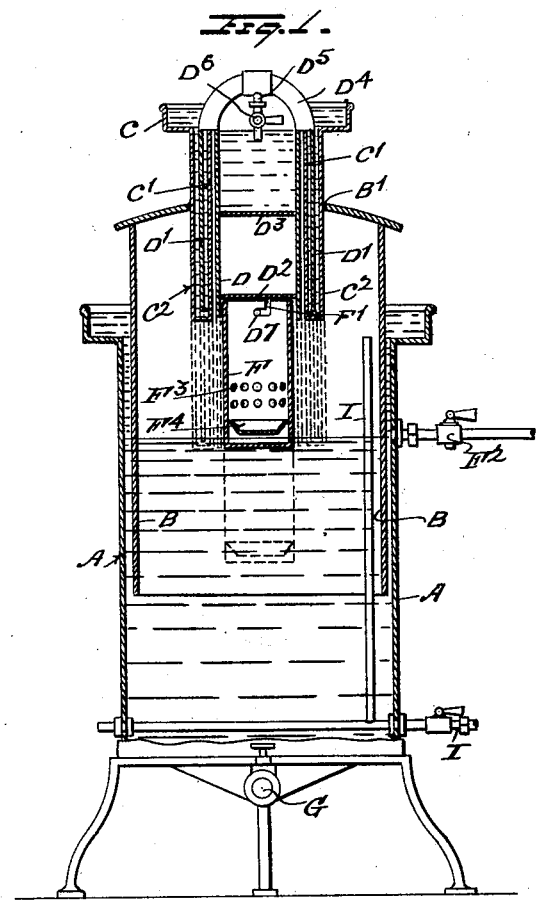
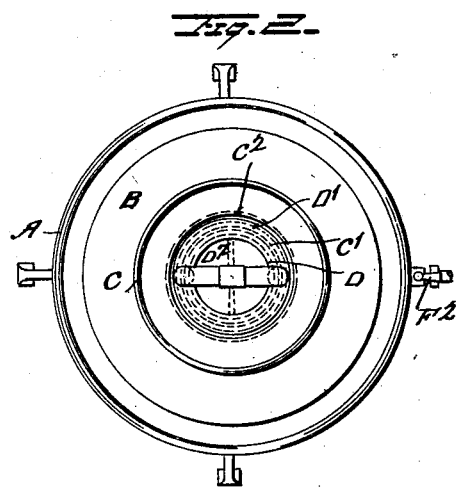
Witnesses
Inventor
A. D. Williamson
by his Attorney
THE NORRIS PETERS CO., PHOTO-LITHO., WASHINGTON, D. C.

UNITED STATES PATENT OFFICE.

ALEXANDER DAVIDSON WILLIAMSON, OF COLERAINE, IRELAND.

ACETYLENE-GAS GENERATOR.

SPECIFICATION forming part of Letters Patent No. 699,271, dated May 6, 1902.

Original application filed May 22, 1899, Serial No. 717,833. Divided and this application filed November 5, 1900. Serial No. 35,574. (No model.)

*To all whom it may concern:*

Be it known that I, ALEXANDER DAVIDSON WILLIAMSON, a subject of the Queen of Great Britain, and a resident of Bridge street, Coleraine, in the county of Londonderry, Ireland, have invented a certain new and useful Improved Charging Device for Acetylene-Generators, (being a division of application No. 717,833, filed May 22, 1899,) of which the following is a specification.

This invention has for its object a charging device for acetylene-generators; and it consists, briefly, of a hollow cylinder inserted in a grooved annular flange of the generator, said cylinder being closed below, having its upper part adapted to contain water and surrounded by an outer cylinder connected to it at the upper end in a gas-tight manner and adapted to enter the said annular flange and to be sealed therein by water, and a carbid-holding vessel or cage adapted to be removably attached to the charging-cylinder, preferably by means of bayonet-slots engaging a cross-rod at or near the bottom thereof.

In the accompanying drawings, Figure 1 is a vertical section of a generator, showing the charging vessel and carbid-cage in place therein. Fig. 2 is a plan view thereof.

A is a vessel intended at the time of charging to be filled with water to the level of tap $F^2$ and when the charge has been put in to be filled with water to the top of said vessel.

B is a gas-bell having free ascensional movement in vessel A.

In the drawings the full lines indicate the position of the charging vessel and carbid-cage when in action and the broken lines the position when at rest, the carbid-cage being submerged in water to recharge.

In the top of the gas-bell B is an opening B', in which is fitted a hollow cylinder C, connected at its lower end to another hollow cylinder C' of smaller diameter within it, thus forming an annular flange $C^2$, extending downwardly for some distance into the bell B and forming in itself an annular receptacle for water. A hollow cylinder D, called the "charging vessel," which can be loosely inserted in the orifice within the flange $C^2$, is closed near its lower end by a water and gas tight diaphragm $D^2$ and near its upper end also by a similar diaphragm $D^3$. To a flange at the upper end of cylinder D there is attached in a gas-tight manner a downwardly-directed cylinder D', which when the cylinder D is in place descends into the annular space in the flange $C^2$, which space being filled up with water thus constitutes a water seal for the cylinder D, so that the whole orifice is now closed against outlet of gas from the interior of the bell.

The space between tube D' and vessel D is closed above, and a pipe $D^4$ extends across from one side to the other, forming a handle and also a communication with the blow-off pipe $D^5$, having a cock $D^6$ for escape of air before commencement of gas-making. Below the diaphragm $D^2$ the cylinder D carries a cross-rod $D^7$, to which the carbid vessel F may be detachably connected by bayonet-slots having a self-locking arrangement. This carbid-holding vessel consists of a preferably circular cage having at its bottom a dish $F^4$ for reception of the carbid and is provided with perforations $F^3$ in its walls for permitting admittance of water thereto. It is also provided at its upper edge with angular slots F', adapted to engage rod $D^7$ for suspending it to the latter.

Water is placed above diaphragm $D^3$ to keep the charging vessel cool and regulate the working pressure. G is a cleaning-out valve at the lower end of the conical-shaped bottom or taper outlet-pipe of the vessel A.

To recharge, the taps $F^2$ and $D^6$ are opened and the charging vessel D is withdrawn, the dip of the flange $C^2$ (the lower edge of which is below the water-level in vessel A) preventing the gas in bell B from escaping. Carbid being placed in cage F and the latter hooked onto rod $D^7$, the charging vessel D is replaced within flange $C^2$, the carbid being first dipped in hydrocarbon oil for the purpose of preventing it being acted upon too quickly by the water, so that gas is not generated too quickly. On the carbid in the cage F touching the water in holder A at the level of $F^2$ gas will be generated and the taps $D^6$ and $F^2$ are then shut. The bell B will then rise and keep the carbid at the surface of the water and generate only the amount of gas which may be required for the supply or for the filling up of the gas-holder. The pressure is regulated by the weight of water above the diaphragm $D^2$. The generator-holder is supplied with water from time to time after each discharge. The tap on pipe I, by which the gas is drawn off, indirectly regulates the generating rate of production of gas and may be used as may be found necessary to keep up supply.

It will be obvious from the construction above described that since the interior of the charging vessel is shut off from the gas-space by means of the diaphragm $D^2$ near its lower end no gas can enter the interior of the charging vessel to cause danger when the latter is withdrawn for recharging. On the other hand, there being a closable outlet from the space between cylinders D and D' when the charging vessel is being inserted the air previously in the space to be occupied by the charging vessel is allowed to escape without being forced under the water seal at the lower end of flange $C^2$ into the bell B.

I claim—

In an acetylene-gas generator provided with a water-tank the combination of a gas-holder disposed in said tank and being provided at its top with a charging-opening the walls of which are inclosed by open-mouthed concentric cylinders closed at their bottom and forming a water seal, of a charging device comprising concentric cylinders closed at their top the inner of said concentric cylinders being divided by partitions into a water-chamber and an air-chamber and being adapted to be inserted in the charging-opening of the holder and the outer one of said cylinders being adapted to be inserted in the water seal, a connecting-pipe at the top of the charging-cylinders and affording communication to the space within the walls thereof, a valved extension to said pipe adapted to enter the water-chamber of the inner charging-cylinder and a perforated carbid-holding vessel attached to the bottom partition of said cylinder, substantially as described.

In witness whereof I have signed this specification in the presence of two witnesses.

ALEXANDER DAVIDSON WILLIAMSON.

Witnesses:
SAMUEL CUNNINGHAM,
JAMES CRAWFORD.